(12) United States Patent
Zhong

(10) Patent No.: US 7,765,666 B2
(45) Date of Patent: Aug. 3, 2010

(54) BEARING REMOVAL DEVICES

(75) Inventor: Ping Zhong, Austin, TX (US)

(73) Assignee: Teco-Westinghouse Motor Company, Round Rock, TX (US)

( * ) Notice: Subject to any disclaimer, the term of this patent is extended or adjusted under 35 U.S.C. 154(b) by 33 days.

(21) Appl. No.: 11/771,729

(22) Filed: Jun. 29, 2007

(65) Prior Publication Data
US 2007/0261221 A1 Nov. 15, 2007

Related U.S. Application Data

(62) Division of application No. 10/841,209, filed on May 7, 2004.

(51) Int. Cl.
*B23P 19/04* (2006.01)
(52) U.S. Cl. .............. 29/259; 20/270; 20/278; 20/281.6
(58) Field of Classification Search ........... 29/256–266, 29/270, 271, 278, 281.1, 281.6
See application file for complete search history.

(56) References Cited

U.S. PATENT DOCUMENTS

| | | | |
|---|---|---|---|
| 1,152,681 A | 9/1915 | Wieselgreen | |
| 1,227,457 A * | 5/1917 | Langan | 29/259 |
| 2,509,775 A | 5/1950 | Libert | |
| 2,860,407 A | 11/1958 | Grunder et al. | |
| 3,505,881 A | 4/1970 | Varner | |
| 3,599,311 A | 8/1971 | Ellis | 29/239 |
| 3,924,906 A | 9/1975 | Kitaoka | |
| 4,492,018 A | 1/1985 | Rode | 29/437 |
| 4,514,890 A | 5/1985 | Stewart | 29/256 |
| 4,714,576 A | 12/1987 | Cotton et al. | |
| 4,771,528 A | 9/1988 | Stromberg | 29/259 |
| 4,940,342 A | 7/1990 | Miyazawa et al. | |
| 4,989,312 A | 2/1991 | Maddalena | 29/259 |
| 5,059,041 A | 10/1991 | Watanabe et al. | |
| 5,445,457 A | 8/1995 | Schliephack | |
| 5,727,298 A | 3/1998 | Strong | 29/259 |
| 5,836,698 A | 11/1998 | Richardson | |
| 6,030,128 A | 2/2000 | Pontzer | |
| 6,081,056 A | 6/2000 | Takagi et al. | |
| 6,085,398 A * | 7/2000 | Arch | 29/239 |
| 6,102,574 A | 8/2000 | Proschel et al. | |
| 6,568,859 B1 | 5/2003 | Stegmeier | |
| 6,886,228 B1 | 5/2005 | Chen | 29/263 |

(Continued)

FOREIGN PATENT DOCUMENTS

DE 196 07 336 8/1997

OTHER PUBLICATIONS

"Field application note: rolling element bearings," Reliability Direct, http://www.reliabilitydirect.com/appnotes/reb.html, printed Dec. 9, 2003.

(Continued)

*Primary Examiner*—Lee D Wilson
(74) *Attorney, Agent, or Firm*—Fulbright & Jaworski LLP

(57) ABSTRACT

Load-balancing and bearing removal devices useful in removing bearings, such as rolling element bearings, for rotating machine maintenance and replacement. Insulation assemblies useful with bearing assemblies that fit in openings in bearing brackets of rotating machines, such as large synchronous motors or generators.

13 Claims, 5 Drawing Sheets

U.S. PATENT DOCUMENTS

| | | |
|---|---|---|
| 7,071,589 B2 | 7/2006 | Bramel et al. |
| 2002/0121821 A1 | 9/2002 | Ritter |
| 2002/0190581 A1 | 12/2002 | Gass et al. |
| 2003/0086630 A1 | 5/2003 | Bramel et al. |

OTHER PUBLICATIONS

International Preliminary Report on Patentability and Written Opinion issued in Application No. PCT/US2005/016136, dated Nov. 16, 2006.

Notice of Allowance and Fee(s), issued in U.S. Appl. No. 11/771,605, dated Dec. 16, 2009.

Pre-Appeal Brief Request, filed in U.S. Appl. No. 11/771,605, filed Jun. 9, 2009.

Notice of Panel Decision from Pre-Appeal Brief Review, issued in U.S. Appl. No. 11/771,605, mailed Jul. 29, 2009.

Office Action, issued in U.S. Appl. No. 11/771,605, dated Mar. 4, 2009.

Response to Mar. 4, 2009 Office Action, filed in U.S. Appl. No. 11/771,605, filed Mar. 11, 2009.

Office Action issued in U.S. Appl. No. 11/771,605, dated Oct. 16, 2008.

Response to Oct. 16, 2008 Office Action, filed in U.S. Appl. No. 11/771,605, filed Jan. 16, 2009.

Office Action issued in U.S. Appl. No. 11/771,698, dated Oct. 9, 2009.

* cited by examiner

BEARING REMOVAL DEVICES

CROSS-REFERENCES TO RELATED APPLICATION(S)

This is a divisional of co-pending application Ser. No. 10/841,209, filed May 7, 2004.

BACKGROUND OF THE INVENTION

1. Field of the Invention

The invention relates generally to the field of rotating machines, such as motors and generators. More particularly, it relates to bearing assemblies used with such machines and devices useful when removing the bearing assemblies.

2. Description of Related Art

Rolling element bearings, also known as anti-friction bearings, are widely used on many types of rotating machinery and have a limited life span. That life span can be reduced by misuse and adverse operating conditions. Bearing removal is frequently required in the field as part of the rotating machinery's maintenance.

Traditionally, bearing assemblies have been designed such that the removal of the bearing requires the removal of the entire bearing bracket that houses the bearing and that is mounted to the frame of the rotating machine (e.g., a motor or a generator). FIGS. 1 and 2 show an example of such a prior art bearing assembly.

Bearing 10 was positioned, or housed, in bearing bracket 20. Inner race 12 of bearing 10 contacted shaft 30 of the rotating machine (the body of which is not shown). Outer race 14 of bearing 10 contacted machined cavity 22 of bearing bracket 20. Rolling elements 16 (balls in this case) were positioned between, and in direct contact with, the two races. An inner cap 28 was bolted to bearing bracket 20 with bolts 25 positioned through bolt holes 27. The bearing bracket had a machined rim 24 near its outer edge that fit with very little radial clearance into the machined frame of the rotating machine. That tight fit between the frame and bearing bracket 20 is commonly known as a spigot fit, and bearing bracket 20's rim 24, which fit tightly inside of the machined frame, is known as a spigot. Mounting bolts (not shown, but see FIG. 1, which shows mounting holes 32) secured bracket 20 to the frame of the rotating machine to ensure that spigot 26 remained in contact with the frame. During normal operation, the rotor weight was transmitted through the bearings to the bearing brackets (there is typically one at each end of the machine) and through each bracket's spigot to the frame of the rotating machine, which was supported by the site foundation.

Bearing 10 has been removed from rotating machines, such as motors and generators, using jacking bolts. Jacking holes 34 were positioned in bearing bracket 20. Jacking bolts are normal bolts that were screwed into jacking holes 34, which were located evenly around the outside of the bearing bracket such that they aligned with flat, solid steel surfaces on the frame of the rotating machine. As the jacking bolts were placed in jacking holes 34 and tightened, the bottom of the bolts came into contact with the steel surface of the frame. Gradual and even tightening of all the jacking bolts caused the jacking bolts to pull bearing bracket 20 out of the frame. Bearing 10 typically stayed in place on shaft 30 because inner cap 28 was first un-bolted from bearing bracket 20. Because 10 normally stayed in place on shaft 30, bearing bracket 20 could only be removed a short distance before it had to be supported to keep it from falling onto and possibly damaging shaft 30. The weight of bearing bracket 20 (potentially over 200 pounds for a 300 horsepower (HP) rotating machine) generally required a crane or other large lifting device to be used for bearing removal on 300 HP (and larger) motors.

To summarize, the following steps have been taken during removal of the bearing shown in FIGS. 1 and 2. The end of shaft 30 has been supported using any suitable mechanism, such as a crane or jacks. The mounting bolts positioned in mounting holes 32 that held bearing bracket 20 to the frame of the rotating machine have been removed, as have bolts 25 positioned in bolt holes 27 that held inner cap 28 to bearing bracket 20. Jacking bolts have been inserted into jacking holes 34. The jacking bolts have been tightened gradually and evenly until spigot 26 of bearing bracket 20 has been completely pulled out of the frame. The supported shaft end has been lowered down until the rotor core (not shown) surrounding shaft 30 contacts the stator core (not shown) surrounding the rotor core. The shaft support has been removed. A crane has been attached to bearing bracket 20 and removed bearing bracket 20. A traditional bearing puller has been used to remove bearing 20 from around shaft 30.

An advance was made with the creation of the bearing assembly shown in FIGS. 3 and 4. Bearing assembly 40 (sometimes called a bearing cartridge) is positioned in a bearing assembly opening 42 of bearing bracket 20. Bearing 10 is seated inside of bearing assembly 40 instead of directly in bearing bracket 20, as shown in FIG. 2. As a result, the end user only had to remove bearing assembly 40—not bearing bracket 20—in order to remove bearing 10. Bearing assembly 40 is considerably lighter than bearing bracket 20 and eliminates the need for a crane.

Bearing assembly 40 includes a cylindrical insert 44, an inner cap 28, an outer cap 46, and bearing 10. Insert 44 was machined on its inside to hold bearing 10 tightly and had a spigot fit with bearing bracket 20. Insert 44 also had mounting bolt holes 48 through which bolts were placed to secure insert 44 to bearing bracket 20. Insert 44 also had insert jacking holes 49 that allowed for removal of the bearing assembly from bearing bracket 20. Insert 44, outer cap 46, and inner cap 28 each had aligned openings (designated generally at 50) that allowed them to be bolted together with bolts 52. Outer cap 46 was a disk that bolted onto insert 44 and that had a small clearance fit with shaft 30 to hold the bearing grease inside of bearing assembly 40. Inner cap 28 also was a disk that had a small clearance fit with shaft 30 for grease retention, but also had two ring-shaped projections 51 and 53, positioned to align with inner race 12 and outer race 14, respectively, of bearing 10. Those projections allowed inner cap 28 to act as a bearing puller.

During bearing removal, the jacking bolts positioned in insert jacking holes 49 pulled bearing assembly 40 out of bearing bracket 20. Because inner cap 28 was bolted insert 44, ring-shaped projections 51 and 53 contacted bearing 10's inner race 12 and outer race 14, respectively, and pulled bearing 10 off of shaft 30 during removal. This eliminated the need for the end user to use a bearing puller. Also, the lighter weight of bearing assembly 40 (versus bearing bracket 20) and the presence of bearing 10 in bearing assembly 40 reduced the risk of the bearing assembly falling sizable distances and damaging the shaft as the bearing assembly was pulled off of the end of the shaft.

To summarize, the following steps have been taken to remove bearing assembly 40. The end of shaft 30 has been supported. The mounting bolts running through mounting bolt holes 48 have been removed. Those same bolts have then been used as jacking bolts, inserted into insert jacking holes 49 and tightened gradually and evenly until bearing assembly 40 was removed from bearing assembly opening 42 of bearing bracket 40. Shaft 30 was lowered until the rotor core (not shown) surrounding the shaft contacted the stator core (not shown) surrounding the rotor core. The shaft support was removed. The loose bearing assembly 40 was removed by sliding it off of the end of the shaft.

The inventors have discovered certain shortcomings associated with the removal of bearing assembly 40 shown in FIG. 4. While removing bearing assembly 40 from bearing assembly opening 42, a large friction force is induced between bearing 10 and shaft 30 tends to move shaft 30 in the same direction as bearing 10. This shaft motion or force is transferred to, and undertaken by, the bearing or coupling at the other end of the shaft. If that bearing (i.e., at the other end) is a rolling element bearing, the friction force between that bearing and the shaft will cause the entire rotor assembly to be moved in the direction of bearing 10. Alternatively, the load will be undertaken by the rolling elements of the bearing or the inner cap located at the other end of shaft 30.

SUMMARY OF THE INVENTION

The present load-balancing devices and methods, the present bearing removal devices, and the present methods useful in removing a bearing from around a shaft provide mechanisms and steps that address the force transfer problems described above. The present load-balancing devices are configured for use with a rotating machine that has a shaft, a bearing bracket surrounding the shaft, and a bearing surrounding the shaft. Certain embodiments of these load-balancing devices include a shaft engagement element that is configured to engage an end of the shaft; a bearing bracket engagement element that is configured to engage the bearing bracket; and a connector element connecting the shaft engagement element to the bearing bracket engagement element; where the shaft engagement element, the bearing bracket engagement element, and the connector element are configured with respect to each other such that at least a portion of the connector element will be positioned outside the bearing bracket (i.e., closer to the exterior of the bearing bracket than to the interior of the bearing bracket). Other embodiments of the present load-balancing devices and details associated with those embodiments are described below.

Certain embodiments of the present load-balancing methods include providing a rotating machine that has a shaft that has an end and a shaft position; a bearing bracket surrounding the shaft and having an outer surface and a bearing bracket position; and a bearing surrounding the shaft. These methods also include fixing the shaft position relative to the bearing bracket position to achieve a fixed shaft; and moving the bearing along a portion of the fixed shaft. Other embodiments of the present load-balancing methods and details associated with those embodiments are described below.

The present bearing removal devices are configured for use with a rotating machine that has a shaft, a bearing bracket having a bearing assembly opening, and a bearing assembly positioned in the bearing assembly opening. The bearing assembly includes a bearing surrounding a shaft. Certain embodiments of the present bearing removal devices include a shaft contacting element configured to contact an end of the shaft; a bearing assembly engagement element configured to engage the bearing assembly; and a connector element connecting the shaft contacting element to the bearing assembly engagement element; where the shaft contacting element, the bearing assembly engagement element, and the connector element are configured with respect to each other such that at least a portion of the connector element will be positioned outside the bearing assembly (i.e., closer to the exterior of the bearing assembly than to the interior of the bearing assembly). Other embodiments of the present bearing removal devices and details associated with those embodiments are described below.

Certain embodiments of the present methods useful in removing a bearing from around a shaft include providing a rotating machine that has a shaft having an end; a bearing bracket surrounding the shaft and having a bearing assembly opening; and a bearing assembly positioned in the bearing assembly opening, the bearing assembly including a bearing surrounding the shaft. These methods also include using a device that (a) causes the bearing assembly to move in a first direction and (b) directs a force on the shaft in a second direction that is substantially opposite the first direction. Other embodiments of the present methods useful in removing a bearing from around a shaft and details associated with those embodiments are described below.

Also disclosed are apparatuses that include a bearing assembly having an insulation assembly. Certain embodiments of the present apparatuses include a bearing assembly that is configured to be positioned in a bearing assembly opening of a bearing bracket of a rotating machine. These bearing assemblies include a rolling element bearing that is configured to surround a shaft of the rotating machine; an inner cap having a portion that is positioned on one side of the rolling element bearing; an outer cap having a portion that is positioned on another side of the rolling element bearing; and an insulation assembly that is configured to substantially insulate the rolling element bearing. Other embodiments of the present apparatuses and details associated with those embodiments are described below.

BRIEF DESCRIPTION OF THE DRAWINGS

The following drawings illustrate by way of example and not limitation. The use of identical reference numerals does not necessarily indicate an identical structure. Rather, the same reference numeral may be used to indicate a similar feature or a feature with similar functionality.

DESCRIPTION OF ILLUSTRATIVE EMBODIMENTS

The terms "comprise" (and any form of comprise, such as "comprises" and "comprising"), "have" (and any form of have, such as "has" and "having"), and "include" (and any form of include, such as "includes" and "including") are open-ended linking verbs. As a result, a device or method that "comprises," "has," or "includes" one or more elements or steps possesses those one or more elements or steps, but is not limited to possessing only those one or more elements. Likewise, an element of a device or a step of a method that "comprises," "has," or "includes" one or more features possesses those one or more features, but is not limited to possessing only those one or more features.

Thus, and by way of example, a load-balancing device "comprising" a shaft engagement element configured to engage an end of a shaft; a bearing bracket engagement element configured to engage a bearing bracket; and a connector element connecting the shaft engagement element to the bearing bracket engagement element, has, but is not limited to having only, the recited elements and features. That is, the load-balancing device possesses at least the recited elements and features, but does not exclude other elements or features that are not expressly recited.

The terms "a" and "an" are defined as one or more than one unless this disclosure explicitly requires otherwise.

Figure 2:
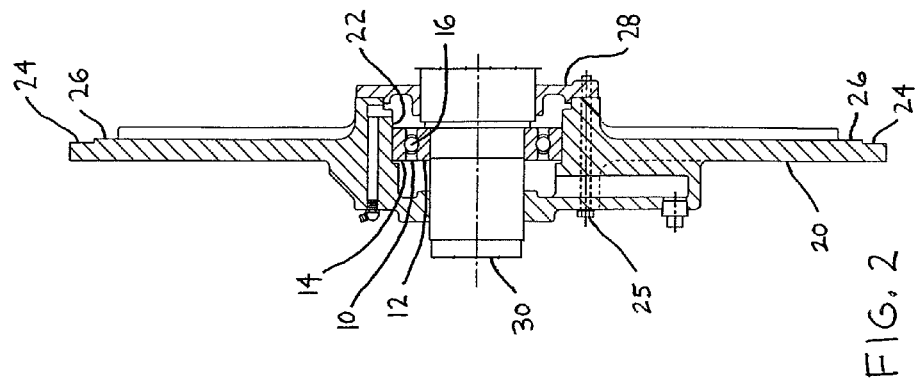
FIG. 2 is a cross-sectional view taken along line A-A in FIG. 1.
Figure 1:
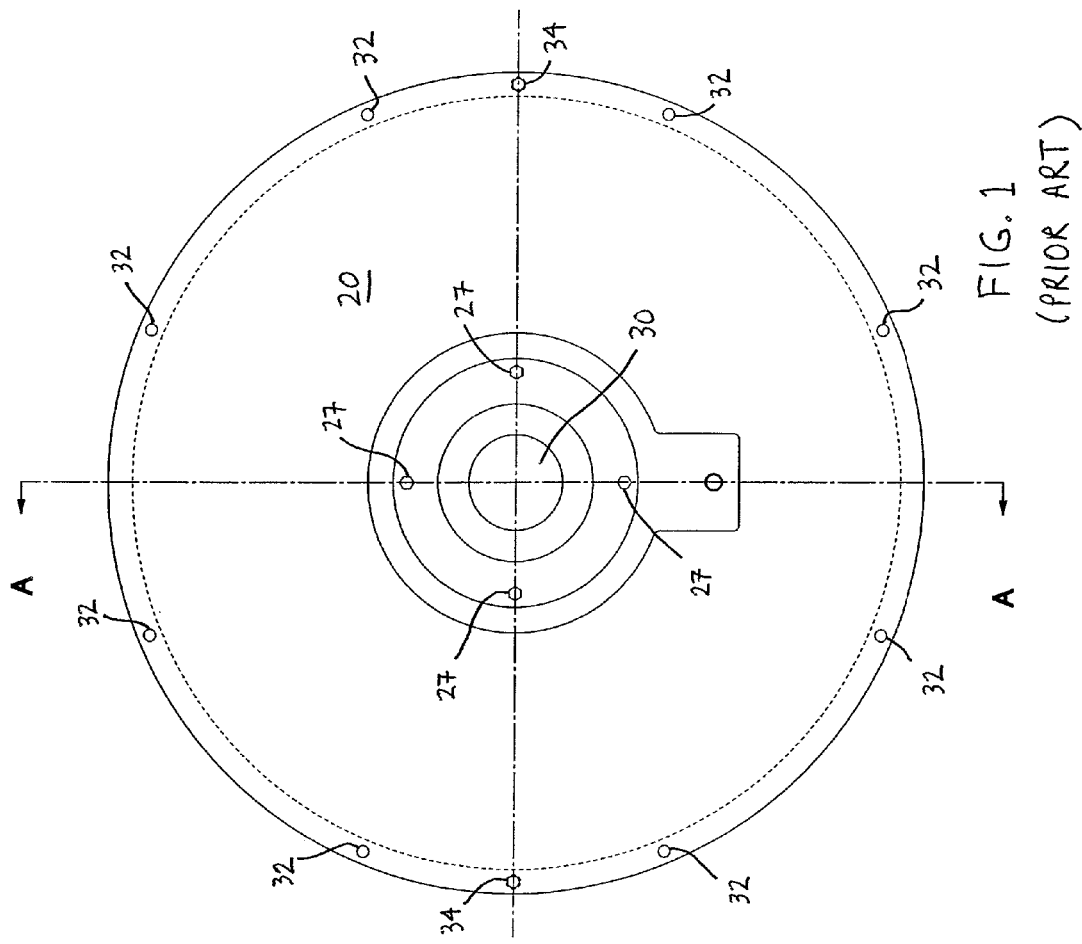
FIG. 1 is a front view of a prior art bearing assembly.
Figure 4:
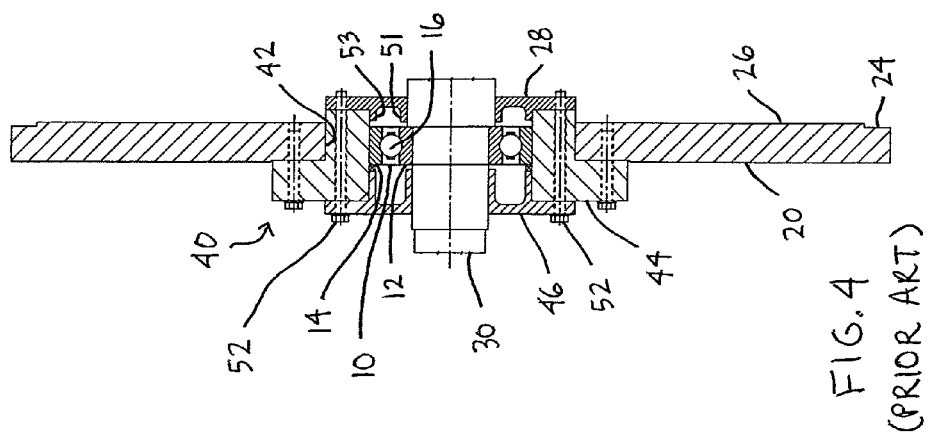
FIG. 4 is a cross-sectional view taken along line A-A in FIG. 3.
Figure 3:
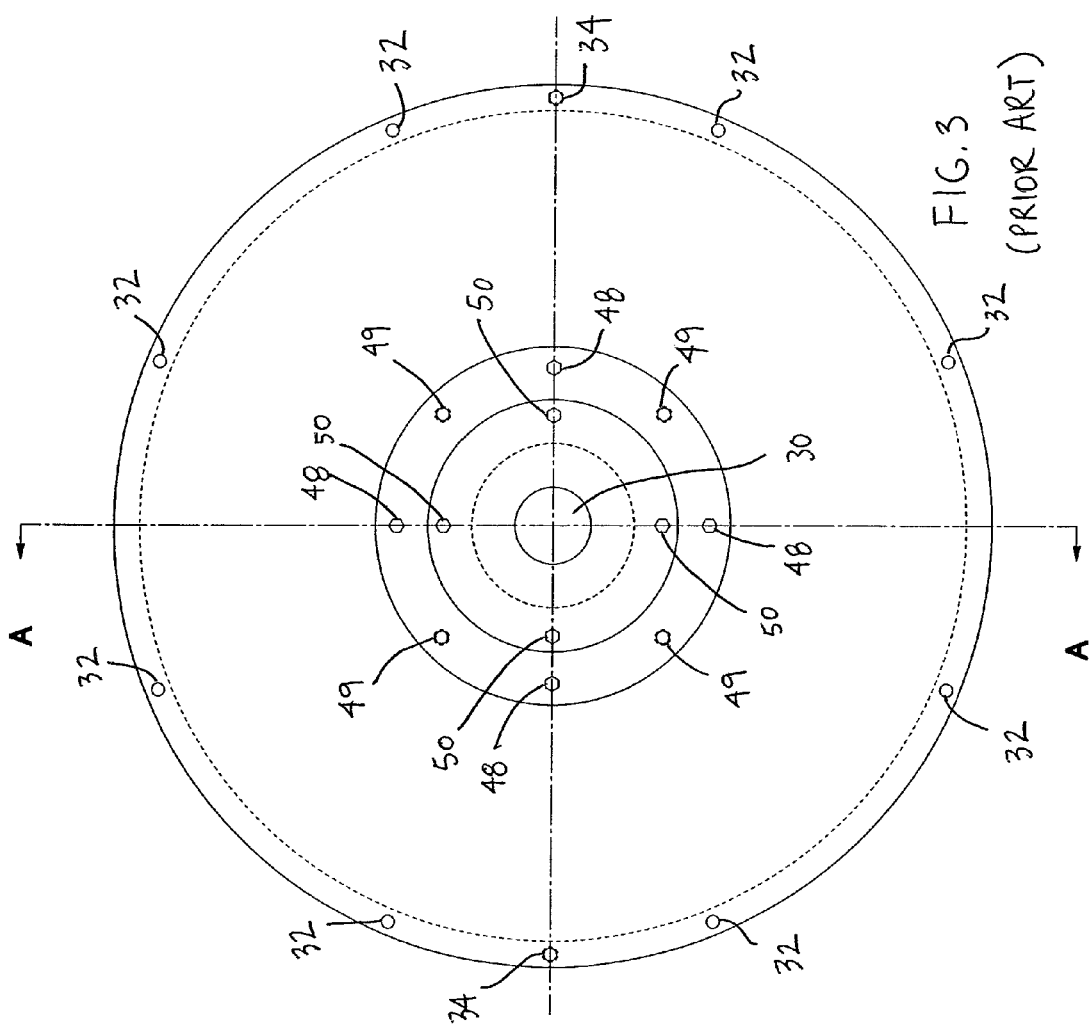
FIG. 3 is a front view of another prior art bearing assembly.
Figure 5:
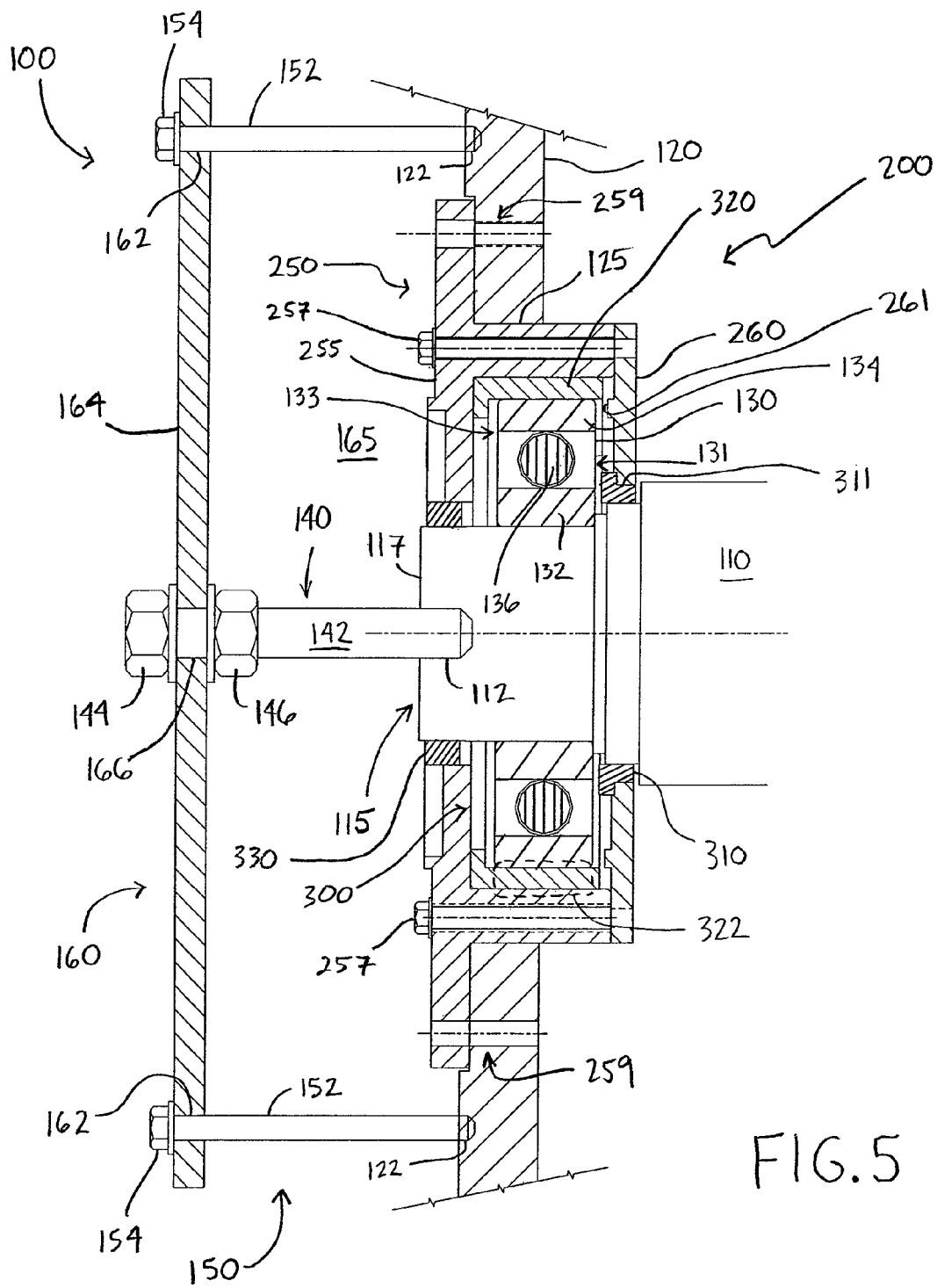
FIG. 5 is a cross-sectional view of one of the present load-distribution devices and one of the present insulation assemblies.

FIG. 5 shows one embodiment of the present load-balancing devices. The term "load-balancing" does not mean that a perfect balance of forces is achieved using any of the present devices or methods. Load-balancing device 100 is configured for use with a rotating machine (not shown). "Rotating machine" is defined as any machine having an element—such as a shaft—that rotates as part of the machine's operation. Rotating machines with which the present load-balancing devices are particularly useful include motors and generators, and more specifically those that are capable of producing at least ¼ horsepower.

The rotating machine includes a shaft 110, a bearing bracket 120 surrounding shaft 110, and a bearing 130 surrounding shaft 110. "Surrounding" is defined such that a first structure that surrounds a second structure need not necessarily (but can) be in direct contact with the second structure, and other structures may be disposed between the first and second structures.

Load-balancing device 100 includes a shaft engagement element 140 that is configured to engage an end 115 of shaft 110. The "end" of a shaft is defined as including the outermost border of the shaft (also described in this disclosure as the terminal point of the shaft, e.g., flat surface 117 of shaft 110 shown in FIG. 5) through at least that portion of the shaft that contacts the bearing in the bearing assembly. "Engage" is defined as connect to. The types of engagements disclosed include engagement through the use of mating threads, friction, magnetic forces, and any suitable mechanism or means for connecting two things.

Load-balancing device 100 also includes a bearing bracket engagement element 150 that is configured to engage bearing bracket 120, and a connector element 160 that connects shaft engagement element 140 to bearing bracket engagement element 150. As FIG. 5 shows, these three elements are configured with respect to each other such that at least a portion (and, in this embodiment, all) of connector element 160 is positioned on the outside 165 of bearing bracket 120. "Outside," in this context, is defined as closer to the exterior of the bearing bracket than to the interior of the bearing bracket.

In the embodiment shown in FIG. 5, shaft engagement element 140 includes at least a bolt 142, which includes bolt head 144 and which is held to connector element 160 by a nut 146. Bolt 142 is configured to engage, and engages, shaft 110 by being threaded at least partially into a recess 112 that starts at flat surface 117 of shaft 110 and extends into shaft 110. For a rotating machine that generates approximately 1000 horsepower, a one-inch bolt may be used for bolt 142, and a recess depth of 1.5 inches may be used for recess 112. Although only one bolt is shown as being used, multiple bolts may be used to better suit a given application.

In the embodiment shown in FIG. 5, bearing bracket engagement element 150 includes at least two bolts 152, each of which includes a bolt head 154. Bolts 152 may be configured to engage (and, in use, engage) bearing bracket 120 by each being threaded at least partially into recesses 122 in bearing bracket 120. Recesses 122 start at the outer surface of bearing bracket 120 and extend into bearing bracket 120. Alternatively, bolts 152 may be not configured to engage bearing bracket 120, may be not provided with threads, and may simply rest against an unthreaded version of recess 122. Bolts 152 are held to connector element 160 by their threads engaging the holes, or openings, 162 in connector element 160.

For a rotating machine that generates approximately 1000 horsepower, one-inch bolts may be used for bolts 152, and a recess depth of 1.5 inches may be used for recesses 122. Although only two bolts are shown as being used for bearing bracket engagement element 150, more than two bolts (e.g., 3, 4, 5, 6, 7, 8, 9, 10, or more bolts) may be used to better suit a given application.

In the embodiment shown in FIG. 5, connector element 160 includes plate 164. Plate 164 may have any suitable shape, including circular, rectangular (e.g., square), oval, etc. Plate 164 may have a series of fingers that extend like spokes from a central section where opening 166 is positioned through which bolt 142 is threaded or otherwise placed. Any shape that is suited to the application may be used, provided the three elements are configured with respect to each other such that at least a portion of connector element 160 is on the outside 165 of bearing bracket 120.

Load-balancing device 100 may be used to solve the problem (discussed above) with friction between the bearing being removed and the shaft of the rotating machine causing either the shaft or the entire assembly connected to the shaft (e.g., the rotor assembly) from moving in the same direction as the shaft. Consistent with the present load-balancing methods, using load-balancing device 100 will serve to fix the position of shaft 110 relative to the position of bearing bracket 120, thus yielding a fixed shaft. "Fixing" the shaft position relative to the bearing bracket position does not require that the two be prevented from all movement with respect to each other—slight movement is permitted owing to tolerances and the flexing or compaction of materials. Bearing 130 may then be moved along at least a portion of the fixed shaft 110, and the resulting friction force between the moving bearing and the shaft is balanced by the reaction force provided by load-bearing device 100. As a result, no loading will be placed on the opposite end of the rotating machine.

FIG. 5 also shows one embodiment of a bearing assembly that includes an insulation assembly. Apparatus 200 includes bearing assembly 250, which is positioned in bearing assembly opening 125 of bearing bracket 120.

Bearing assembly 250 includes an outer bearing cap 255, an inner bearing cap 260 bolted to outer bearing cap 255 with bearing assembly bolts 257, and bearing 130, which, as shown in this embodiment, may be a rolling element bearing. Bearing 130 includes inner race 132, outer race 134, and rolling elements 136, which may, as shown in this embodiment, be balls. As this embodiment shows, bearing 130 is configured to surround, and surrounds, shaft 110; inner cap 260 has a portion (the entire cap in this embodiment) positioned on one side 131 of bearing 130; and outer cap 255 has a portion positioned on another side 133 of bearing 130. Inner cap 260 and outer cap 255 may be made from any suitable material, including an industry-standard material such as A36 steel or gray cast iron. Any commercially-available bearing may be used for bearing 130.

Bearing assembly 250 also includes insulation assembly 300, which is configured to substantially insulate bearing 130. The term "substantially" is defined as at least close to (and can include) a given value or state (preferably within 10% of, more preferably within 1% of, and most preferably within 0.1% of).

The embodiment of insulation assembly 300 shown in FIG. 5 includes inner insulating ring 310; insulated bushing 320; and outer insulating ring 330. Inner insulating ring 310 is positioned between bearing 130 and the middle (not shown) of shaft 110. Insulated bushing 320 has a portion 322 positioned around at least a portion of bearing 130. Outer insulating ring 330 is positioned nearing the terminal point (e.g., flat surface 117) of shaft 110 than is inner insulating ring 310. Outer insulating ring 330 may be a seal that functions to retain bearing grease. Insulated bushing 320, inner insulating ring 310, and outer insulating ring 330 (which functions as (and is) a seal in certain embodiments) may be made from any suitable dielectric material that possesses sufficient mechanical strength for the application. One such material is a glass cloth laminate impregnated and cured with epoxy resin, which material meets the NEMA G11 standard and is sold commercially as an epoxy fiberglass laminate sheet by International Paper (Stamford, Conn.). Outer insulating ring 330 may also be made a seal commercially available from Inpro/Seal Corporation that has part no. M0098. Insulation assembly 300 may be configured to substantially insulate bearing 130 from both high frequency current (current having a frequency of from about 500 hertz (Hz) to about 3000 Hz), and/or both high frequency and low frequency current (current having a frequency of from about 0 Hz to about 500 Hz) by making insulated bushing 320 at least 0.25 inches thick.

Although the basic embodiment of the present load-balancing methods was described above, additional embodiments will now be discussed. The fixing of the shaft position relative to the bearing bracket position of shaft 110 and bearing bracket 120 in FIG. 5 may be accomplished by, generally, contacting end 115 of shaft 110 with shaft engagement element 140; contacting bearing bracket 120 with bearing bracket engagement element 150; and connecting shaft engagement element 140 to bearing bracket engagement element 150 using, for example, connector element 160. It should be understood that any suitable construction of these three elements may be accomplished to achieve one of the present load-balancing devices.

Figure 6:
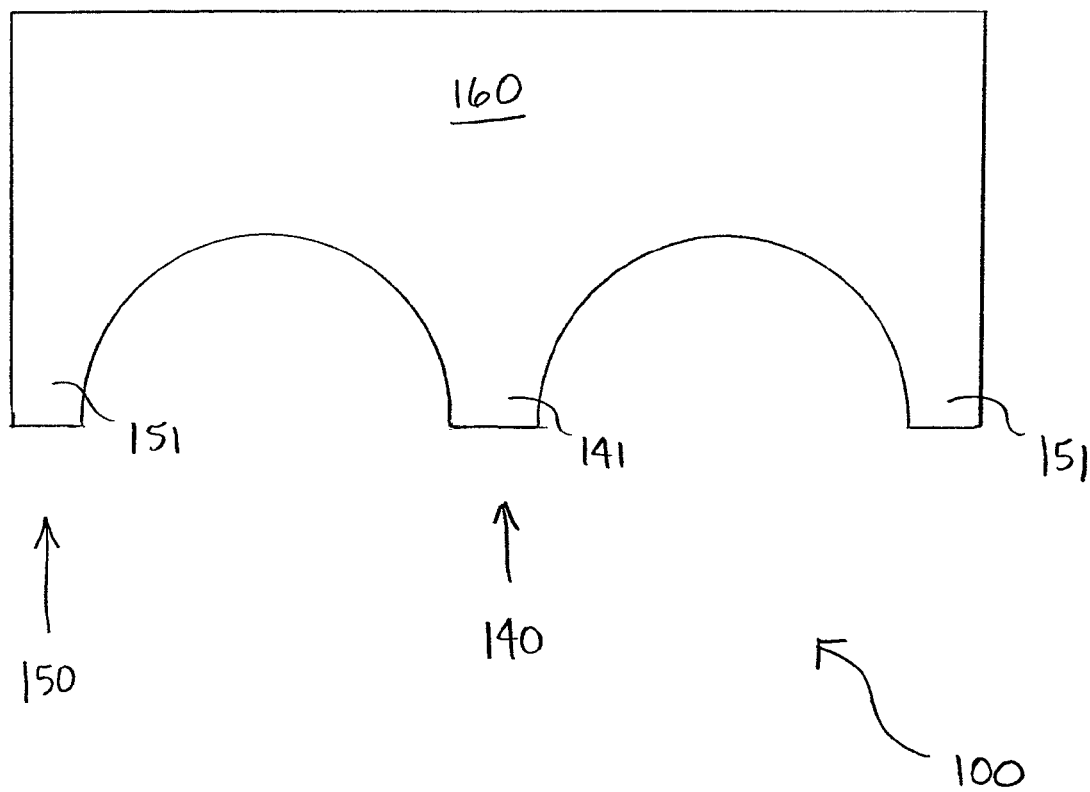
FIG. 6 is a front view of another of the present load-distribution devices.

One feature of the present load-balancing devices is that the various elements are configured with respect to each such that pressure can be applied to shaft 110 and bearing bracket 120, or pressure from shaft 110 and/or bearing bracket 120 can be resisted, at the same time. Thus, the three elements may be made from a single piece of material, such as the embodiment of load-balancing device 100 shown in FIG. 6. In this embodiment, shaft engagement element 140 and bearing bracket engagement element 150 are the result of machining a single piece of material. Shaft engagement element 140 takes the shape of a central projection 141, which extend from and are integrally connected to connector element 160 (which is a portion of the original piece of a material). Similarly, bracket engagement element 150 takes the form of end projections 151, which extend from and are integrally connected to connector element 160. The connecting step discussed above may, in instances where the shaft engagement element is integrally formed with the bearing bracket engagement element, take the form of the manufacturing process that leaves those two elements integrally formed with each other.

Continuing with embodiments of the present load-balancing methods, the contacting of the end 115 of shaft 110 with shaft engagement element 140 may include inserting a portion of shaft engagement element 140 (e.g., bolt 142) into recess 112 of shaft 110. That inserting may include screwing bolt 142 into recess 112, where recess 112 is provided with one or more threads. Similarly, the contacting of the bearing bracket 120 with bearing bracket engagement element 150 may include insert bolts 152 into recesses 122 in bearing bracket 120.

Another of the present load-balancing methods includes removing bearing assembly 250 from around shaft 110. In still another embodiment, where a rotor core (not shown) surrounds shaft 110 and a stator core (not shown) surrounds the rotor core, the removing of bearing assembly 250 may include supporting end 115 of shaft 110 (using a crane, one or more jacks, or any other suitable mechanism); removing the bolts (not shown) that hold bearing assembly 250 to bearing bracket 120 (the holes, or openings, for such bolts are designated generally in both structures by element 259 in FIG. 5); inserting those bolts (which may be characterized as jacking bolts) into openings (which may be described as jacking holes, or jacking openings) in bearing assembly 250 (and, more specifically, in outer cap 255) that are aligned with flat portions of bearing bracket 120; tightening the jacking bolts (e.g., gradually and evenly; as many jacking bolts as are needed may be used, for example, 2, 3, 4, 5, 6, 7, 8, 9, 10, or more jacking bolts may be used) until bearing assembly 250 is removed from bearing assembly opening 125 in bearing bracket 120; and lowering shaft 110 so as to cause the rotor core to contact the stator core.

The removing of the various bolts (discussed throughout this disclosure) may be achieved, in appropriate circumstances, without removing some or all of the bolts all of the way out of all the openings through which they are threaded. Furthermore, the tightening of the jacking bolts will serve to move bearing 130 along at least a portion of fixed shaft 110 and, more specifically, will ultimately move bearing assembly 250 out of bearing assembly opening 125 because inner cap 260 is connected to outer cap 255, and inner cap 260 can be provided with a protruding shoulder 261 that is configured to contact outer race 134 of bearing 130. Protruding shoulder 261 will, therefore, contact bearing 130 at outer race 134 and help to move bearing 130 along fixed shaft 110 as bearing assembly 250 is jacked out of bearing assembly opening 125. Furthermore, in this embodiment, inner insulating ring 310 has a female notch 311 that is in contact with a portion of inner cap 260, as shown in FIG. 5. Inner insulating ring 310 is configured (by virtue of its inner diameter) to contact inner race 132 of bearing 130 and help to move bearing 130 along fixed shaft 110 as bearing assembly 250 is jacked out of bearing assembly opening 125.

Figure 7:
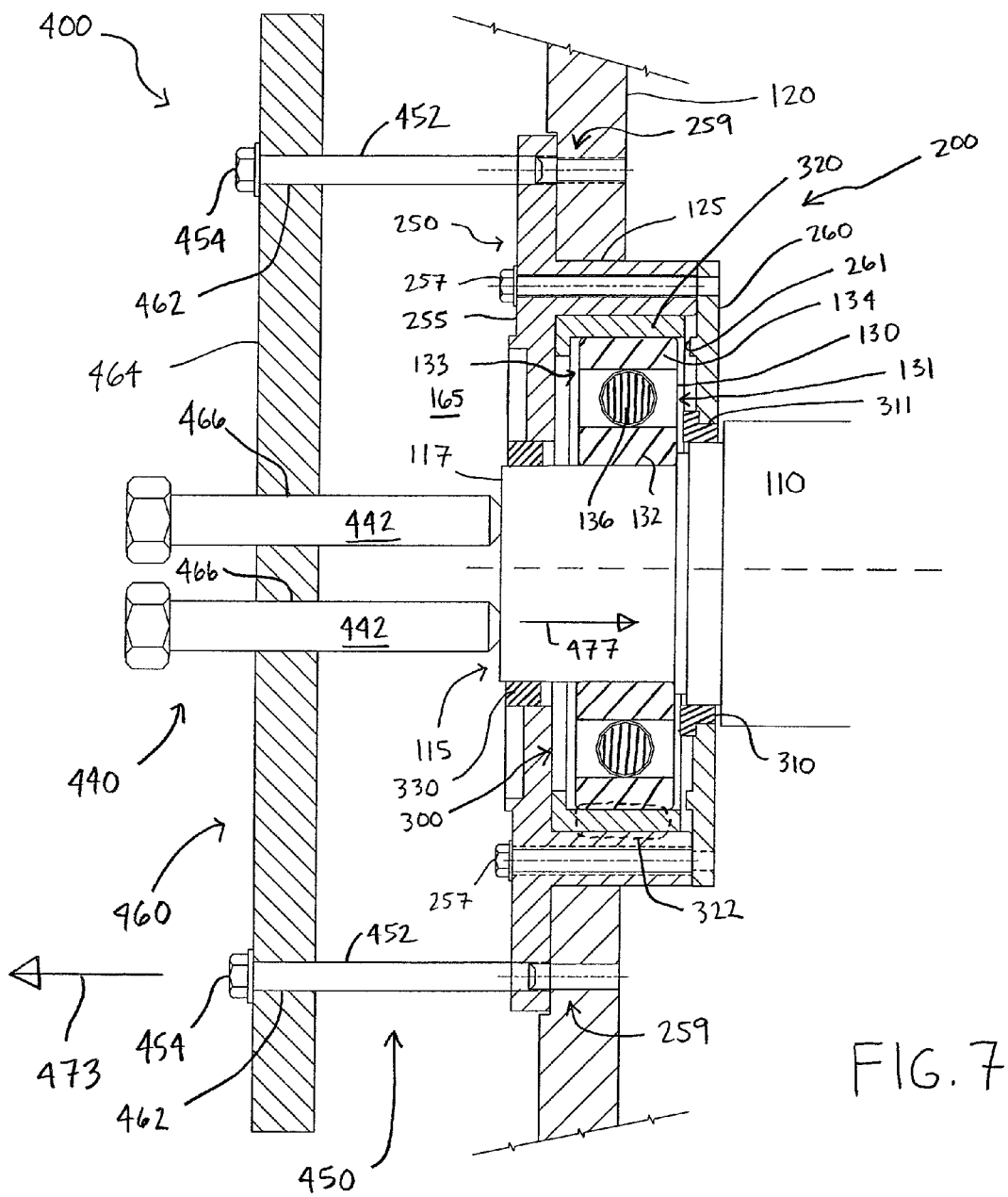
FIG. 7 is a cross-sectional view of one of the present bearing removal devices.

FIG. 7 shows one embodiment of the present bearing removal devices. Bearing removal device 400 is configured for use with a rotating machine (not shown) having at least one shaft-mounted rolling element bearing. Rotating machines with which the present bearing removal device are particularly useful include motors and generators. The rotating machine can include the features of the rotating machine discussed above.

Bearing removal device 400 includes a shaft contacting element 440 that is configured to engage an end 115 of shaft 110. Bearing removal device 400 also includes a bearing assembly engagement element 450 that is configured to engage bearing assembly 250, and a connector element 460 that connects shaft contacting element 440 to bearing assembly engagement element 450. As FIG. 7 shows, these three elements are configured with respect to each other such that at least a portion (and, in this embodiment, all) of connector element 460 is positioned on the outside 165 of bearing assembly 250. "Outside," in this context, is defined as closer to the exterior of the bearing assembly than to the interior of the bearing assembly.

In the embodiment shown in FIG. 7, shaft contacting element 440 includes at least one bolt 442 and, more specifically, at least two bolts 442. Bolts 442, which can be characterized as jacking bolts, can be threaded and placed through openings 466, which can also be threaded. Thus, the connection between connector element 460 and shaft contacting element 440 can be a threaded one. Bolts 442 contact end 115 of shaft 110 (and, more specifically, flat surface 117 of shaft 110) and tighten to move connector element 460—and, thus bearing assembly element 450 and bearing assembly 250—directing a force through shaft 110 that a balanced reaction force to the force that pulls bearing assembly 250 out of bearing assembly opening 125. The reaction force shaft contacting element 440 delivers to shaft 110 keeps shaft 110 from moving with bearing 130 and/or bearing assembly 250 during that removal process. For a rotating machine that generates approximately 1000 horsepower, one-inch bolts may be used for bolts 442.

In the embodiment shown in FIG. 7, bearing assembly engagement element 450 includes at least two bolts 452, each of which includes a bolt head 454. Bolts 452 are configured to engage, and do engage, bearing assembly 250—and, more specifically, outer cap 255—by each being threaded at least partially into recesses in outer cap 255. In the embodiment shown, those recesses may take the form of openings 259, which are the same threaded openings through which bolts may be placed to connect bearing assembly 250 to bearing bracket 120. The openings 462 in connector element 460 may be threaded such that no nuts are needed to secure bolts 452 to connector element 460. Alternatively, however, non-threaded openings 462 and nuts (not shown) may be used to make that connection. For a rotating machine that generates approximately 1000 horsepower, one-inch bolts may be used for bolts 452. Although only two bolts are shown as being used for bearing assembly engagement element 450, more than two bolts (e.g., 3, 4, 5, 6, 7, 8, 9, 10, or more bolts) may be used to better suit a given application.

In the embodiment shown in FIG. 7, connector element 460 includes plate 464. Plate 464 may have any suitable shape, including circular, rectangular (e.g., square), oval, etc.

Bearing removal device 400 may be used to solve the problem (discussed above) with friction between the bearing being removed and the shaft of the rotating machine causing either the shaft or the entire assembly connected to the shaft (e.g., the rotor assembly) from moving in the same direction as the shaft. Consistent with the present methods useful in removing a bearing from around a shaft, using bearing removing device 400 will cause bearing assembly 250 to move in a first direction (designated by arrow 473) and direct a force on shaft 110 in a second direction (designated by arrow 477) that is substantially the opposite of the first direction. The force with which it causes bearing assembly 250 to move in the first direction will be equal to the force that is directed, or transferred, to shaft 110 in the substantially opposite second direction. As a result, no loading will be placed on the opposite end of the rotating machine.

To be clear, the use of bearing removal device 400 can include engaging bearing assembly 250 (and, more specifically, outer cap 255) with bearing assembly engagement element 450 so as to cause bearing assembly 250 to move in the first direction, and contacting shaft 110 with shaft contacting element 440 so as to direct force on the shaft in the second direction. Bearing 130 will move as bearing assembly 250 (of which it is a part) move for the same reasons given above. In one embodiment, the contact of the shaft may include contacting flat surface 117, as shown in FIG. 7. In another embodiment, the engagement of the bearing assembly includes inserting bolts 452 into openings 259 in bearing assembly 250 (and, more specifically, in outer cap 255).

One feature of the present bearing removal devices is that the shaft contacting element and the bearing assembly engagement element be configured with respect to each such that pressure can be applied to shaft 110 at the same time that bearing assembly 250 is withdrawn from bearing assembly opening 125 in bearing bracket 120.

Continuing with embodiments of the present methods useful in removing a bearing from around a shaft, the engaging of the bearing assembly may include inserting (e.g., by threading) one or more bolts 442 through openings 466 in connector element 460 and tightening the bolts (e.g., gradually and evenly if more than one is used) until bearing assembly 250 moves in first direction 473. In still another embodiment, where a rotor core (not shown) surrounds shaft 110 and a stator core (not shown) surrounds the rotor core, the method may include supporting end 115 of shaft 110 (using a crane, one or more jacks, or any other suitable mechanism); removing the bolts (not shown) that hold bearing assembly 250 to bearing bracket 120 (the holes, or openings, for such bolts are designated generally in both structures by element 259 in FIG. 7); and lowering shaft 110 so as to cause the rotor core to contact the stator core.

It should be understood that the present load-balancing devices and methods, the present bearing removal devices, and the present methods useful in removing a bearing from around a shaft are not intended to be limited to the particular forms and steps disclosed. Rather, they are to cover all modifications, equivalents, and alternatives falling within the scope of the claims. For example, although rolling element bearings having balls for rolling elements have been shown in the present figures, other rolling elements—such as rollers—may be used. Furthermore, the claims are not to be interpreted as including means-plus- or step-plus-function limitations, unless such a limitation is explicitly recited in a given claim using the phrase(s) "means for" or "step for," respectively.

I claim:

1. A device configured for use with a rotating machine having a shaft with a first end and a second end, a first bearing bracket coupled to a a first bearing assembly having a bearing surrounding the shaft at the first end, and a second bearing bracket coupled to a second bearing assembly having a bearing surrounding the shaft at the second end, the device comprising:
   a bearing removal device comprising:
      a shaft contacting element configured to contact the first end of the shaft;
      a bearing assembly engagement element configured to engage the first bearing assembly; and
      a connector element connecting the shaft contacting element to the bearing assembly engagement element;
      where the shaft contacting element, the bearing bracket assembly engagement element, and the connector element are configured with respect to each other such that at least a portion of the connector element will be positioned outside the first bearing assembly; and
      where the connector element comprises a flat plate in which at least three circular threaded openings are formed, the shaft contacting element comprises at least one bolt threaded through one of the circular threaded openings, the bearing assembly engagement element comprises at least two bolts that are respectively threaded through at least two of the other circular threaded openings, and the shaft contacting element is centered between the at least two bolts of the bearing assembly engagement element; and a load-balancing device comprising:
  a shaft engagement element configured to engage the second end of the shaft;
  a bearing bracket engagement element configured to engage the second bearing bracket; and
  a second connector element connecting the shaft engagement element to the bearing bracket engagement element;
  where the shaft engagement element, the bearing bracket engagement element, and the second connector element are configured with respect to each other such that at least a portion of the second connector element will be positioned outside the second bearing bracket.

2. The device of claim 1, where the device is configured for use with a rotating machine that is capable of producing at least ¼ horsepower.

3. The device of claim 1, where the bearing assembly includes:
  an outer cap configured to contact the bearing bracket; and
  an inner cap configured to contact the outer cap;
  where the bearing is positioned between at least a portion of the outer cap and a portion of the inner cap; and
  the bearing assembly engagement element is configured to engage the outer cap.

4. The device of claim 1, where the device is configured for use with a rotating machine that is capable of producing approximately 1000 horsepower.

5. The device of claim 1, where the bearing assembly engagement element comprises at least three bolts.

6. The device of claim 1, where the shaft contacting element comprises at least two bolts, each of which is configured with a flat end-configured to contact a flat surface of the first end of the shaft.

7. The device of claim 1, where the at least one bolt of the shaft contacting element has a flat end-configured to contact a flat surface of the first end of the shaft.

8. A device configured for use with a rotating machine having a shaft with a first end and a second end, a first bearing bracket coupled to a a first bearing assembly having a bearing surrounding the shaft at the first end, and a second bearing bracket coupled to a second bearing assembly having a bearing surrounding the shaft at the second end, the device comprising:
  a bearing removal device comprising:
    a shaft contacting element configured to contact the first end of the shaft;
    a bearing assembly engagement element configured to engage the first bearing assembly; and
    a connector element connecting the shaft contacting element to the bearing assembly engagement element;
    where the shaft contacting element, the bearing bracket assembly engagement element, and the connector element are configured with respect to each other such that at least a portion of the connector element will be positioned outside the first bearing assembly; and
    where the connector element comprises a flat plate in which at least three circular openings are formed, at least one of which is threaded, the shaft contacting element comprises at least one bolt threaded through the circular threaded opening, and the bearing assembly engagement element comprises at least two bolts that are respectively positioned through at least two of the other circular openings and secured to the flat plate with nuts; and
  a load-balancing device comprising:
    a shaft engagement element configured to engage the second end of the shaft;
    a bearing bracket engagement element configured to engage the second bearing bracket; and
    a second connector element connecting the shaft engagement element to the bearing bracket engagement element;
    where the shaft engagement element, the bearing bracket engagement element, and the second connector element are configured with respect to each other such that at least a portion of the second connector element will be positioned outside the second bearing bracket.

9. The device of claim 8, where the device is configured for use with a rotating machine that is capable of producing at least ¼ horsepower.

10. The device of claim 8, where the device is configured for use with a rotating machine that is capable of producing approximately 1000 horsepower.

11. The device of claim 8, where the bearing assembly engagement element comprises at least three bolts.

12. The device of claim 8, where the shaft contacting element comprises at least two bolts, each of which is configured with a flat end configured to contact a flat surface of the first end of the shaft.

13. The device of claim 8, where the at least one bolt of the shaft contacting element has a flat end configured to contact a flat surface of the first end of the shaft.

* * * * *

UNITED STATES PATENT AND TRADEMARK OFFICE
CERTIFICATE OF CORRECTION

PATENT NO. : 7,765,666 B2 Page 1 of 1
APPLICATION NO. : 11/771729
DATED : August 3, 2010
INVENTOR(S) : Ping Zhong It is certified that error appears in the above-identified patent and that said Letters Patent is hereby corrected as shown below:

In claim 1, column 10, line 43, delete "coupled to a a first" and insert --coupled to a first-- therefor.

In claim 8, column 11, line 42, delete "coupled to a a first" and insert --coupled to a first-- therefor.

Signed and Sealed this

Fifth Day of October, 2010

David J. Kappos
*Director of the United States Patent and Trademark Office*